United States Patent
Zhao

(10) Patent No.: US 8,833,411 B2
(45) Date of Patent: Sep. 16, 2014

(54) TIRE WITH TREAD

(75) Inventor: Junling Zhao, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 151 days.

(21) Appl. No.: 13/420,647

(22) Filed: Mar. 15, 2012

(65) Prior Publication Data
US 2013/0240098 A1 Sep. 19, 2013

(51) Int. Cl.
*B60C 11/00* (2006.01)

(52) U.S. Cl.
USPC .................................................. 152/209.1

(58) Field of Classification Search
CPC B60C 1/0016; B60C 11/1346; B60C 11/005; B60C 11/00
USPC ....................................................... 152/209.1
See application file for complete search history.

(56) References Cited

U.S. PATENT DOCUMENTS

| | | | |
|---|---|---|---|
| 6,070,630 A * | 6/2000 | Pompei et al. | 152/152.1 |
| 2009/0044892 A1 | 2/2009 | Lippello, II et al. | 152/450 |
| 2009/0084477 A1 * | 4/2009 | Sandstrom et al. | 152/209.5 |
| 2011/0048599 A1 * | 3/2011 | Ryba et al. | 152/209.5 |

OTHER PUBLICATIONS

HallStar Technical Publication *A Plasticizer to Provide Hydrophilicity to Rubber Compounds*, PLASTHALL® P-900. Published at least as early as Sep. 2010.

* cited by examiner

*Primary Examiner* — Ling Choi
*Assistant Examiner* — Lanee Reuther
(74) *Attorney, Agent, or Firm* — Henry C. Young, Jr.

(57) ABSTRACT

The present invention relates to a tire having a rubber tread or rubber layered rubber tread where the rubber tread or rubber tread layers contain a dispersion of polyester phthalate within and on the surface thereof to promote a hydrophilic property for the surface. In one embodiment such promoted hydrophilic property is to promote expelling of water borne mud or snow from within the tread grooves.

3 Claims, 4 Drawing Sheets

TIRE WITH TREAD

FIELD OF INVENTION

The present invention relates to a tire having a rubber tread or rubber layered rubber tread where the rubber tread or rubber tread layers contain a dispersion of polyester phthalate within and on the surface thereof to promote a hydrophilic property for the surface. In one embodiment such promoted hydrophilic property is to promote expelling of water borne mud or snow from within the tread grooves.

BACKGROUND FOR THE INVENTION

Most vehicular tires have a rubber tread of a lug and groove configuration. Many tires are of a co-extruded cap/base construction, wherein the tread cap is an outer rubber layer which contains the lug and groove configuration.

The outer lug surfaces of the tread are normally intended to constitute the running surface of the tire and to promote ground-contacting traction for the tread.

It is appreciated that, for some tire treads, the tread lugs are in a form of individual lugs and/or of circumferential ribs. For the purpose of this invention, tread lugs and ribs are referred to herein as tread lugs, with intervening grooves, unless otherwise indicated.

When such lug and grooved configured tire treads are driven through water, mud or snow, it is important that the water, mud and snow contained within the tread grooves do not effectively stick to the groove surfaces.

It is therefore an important feature of this invention to provide the surface of the tread grooves with a rubber layer to promote such effect such as, for example, a suitable wet coefficient of friction.

A rubber composition for a tire component has been disclosed which contained a diene based elastomer with carbon black and silica reinforcement together with plasticizer as a combination of polyester phthalate plasticizer, namely Plasthall P900™ from Hallstar Company and dibutoxy ethyl adipate plasticizer as Plasthall DBEA from Hallstar Company individually and in combination. Tire components such as, for example, treads, sidewall, apex, chafer, sidewall insert, wire coat and inner liner are suggested. For example, see U.S. Patent Publication No. 2009/0044892, now abandoned.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention, a tire having a rubber tread configured with lugs and grooves positioned between said lugs wherein said tread is comprised of, based on parts by weight per 100 parts by weight rubber (phr):

(A) a tread rubber which includes the outer tread running surface of said tread lugs (to provide a road contacting running surface for said tread), of a tread rubber composition comprised of:
(1) at least one conjugated diene-based elastomer comprised of at least one of polymers of at least one of isoprene and 1,3-butadiene and copolymers of styrene with at least one of isoprene and 1,3-butadiene, where said elastomer(s) are exclusive of:
  (a) quaternary polymers comprised of a combination of all of an unsaturated olefinic nitrile (e.g. acrylonitrile, methacrylonitrile and ethylacrylonitrile), vinyl aromatic compound (e.g. styrene and alpha methyl styrene), conjugated diene and polar polymerizable compound (e.g. compound which contains hydroxyl, epoxy, amide, amino or alkoxysilyl groups), and
  (b) vinyl pyridine based polymers (e.g. polyvinyl pyridine);
(2) dispersion of reinforcing filler in said tread rubber composition comprised of:
  (a) rubber reinforcing carbon black, or
  (b) amorphous, synthetic silica (precipitated silica), or
  (c) combination of precipitated silica and rubber reinforcing carbon black (optionally the weight ratio of precipitated silica to rubber reinforcing carbon black can be at least 1/1),
(3) silica coupling agent for said precipitated silica, (when said tread rubber composition contains said precipitated silica), having a moiety reactive with hydroxyl groups (e.g. silanol groups) on said precipitated silica and another different moiety interactive with said elastomer(s), and
(4) dispersion within and on the surface of said tread, including said tread lugs and grooves, of a plasticizer comprised of polyester phthalate in an amount of from about 5 to about 40, alternately from about 12 to about 30 and alternately from about 15 to about 30, phr thereof, (exclusive of dibutoxy ethyl adipate), or (B) a tread rubber exclusive of the outer running surface of said tread lugs comprised of at least one conjugated diene-based elastomer comprised of at least one of polymers of at least one of isoprene and 1,3-butadiene and copolymer(s) of styrene and 1,3-butadiene and a thin outer tread rubber layer on said tread rubber having a thickness in a range of from about 0.05 to about 2.5 millimeters (mm) to provide a running surface for said tread lugs,
wherein said outer tread rubber layer is comprised of:
(1) at least one conjugated diene-based elastomer comprised of at least one of polymers of at least one of isoprene and 1,3-butadiene and copolymers of styrene with at least one of isoprene and 1,3-butadiene, where said elastomer(s) are exclusive of:
  (a) quaternary polymers comprised of a combination of all of an unsaturated olefinic nitrile (e.g. acrylonitrile, methacrylonitrile and ethylacrylonitrile), vinyl aromatic compound (e.g. styrene and alpha methyl styrene), conjugated diene and polar polymerizable compound (e.g. compound which contains hydroxyl, epoxy, amide, amino or alkoxysilyl groups), and
  (b) vinyl pyridine based polymers (e.g. polyvinyl pyridine);
(2) dispersion of reinforcing filler in said tread rubber composition comprised of:
  (a) rubber reinforcing carbon black, or
  (b) amorphous, synthetic silica (precipitated silica), or (c) combination of precipitated silica and rubber reinforcing carbon black (optionally with a weight ratio of precipitated silica to rubber reinforcing carbon black of at least 1/10), (3) silica coupling agent for said precipitated silica, (when said tread rubber composition contains said precipitated silica), having a moiety reactive with hydroxyl groups (e.g. silanol groups) on said precipitated silica and another different moiety interactive with said elastomer(s), and (4) dispersion within and on the surface of said outer tread rubber layer of a plasticizer comprised of polyester phthalate in an amount of from about 5 to about 40, alternately from about 12 to about 30 and alternately from about 15 to about 30, phr thereof, (exclusive of dibutoxy ethyl adipate), and wherein said tread rubber is exclusive of said polyester phthalate, or (C) a thin tread groove rubber layer on the outer surface of said tread grooves of said tread and exclusive of any appreciable outer running surface of said tread, where said tread groove rubber layer has a thickness in a range of from about 0.05 to about 2.5 millimeters (mm), (thereby a tread groove rubber layer providing an exposed surface of said tread grooves) wherein said tread groove rubber composition comprises:

(1) at least one conjugated diene-based elastomer comprised of at least one polymer of at least one of isoprene and 1,3-butadiene and copolymers of styrene with at least one of isoprene and 1,3-butadiene, where said elastomer(s) are exclusive of:

(a) quaternary polymers comprised of a combination of all of an unsaturated olefinic nitrile (e.g. acrylonitrile, methacrylonitrile and ethylacrylonitrile), vinyl aromatic compound (e.g. styrene and alpha methyl styrene), conjugated diene and polar polymerizable compound (e.g. compound which contains hydroxyl, epoxy, amide, amino or alkoxysilyl groups), and (b) vinyl pyridine based polymers (e.g. polyvinyl pyridine);

(2) dispersion of reinforcing filler in said rubber composition comprised of:

(a) rubber reinforcing carbon black, or (b) amorphous, synthetic silica (precipitated silica), or (c) combination of precipitated silica and rubber reinforcing carbon black (optionally with a weight ratio of precipitated silica to rubber reinforcing carbon black of at least 1/1), and (3) silica coupling agent for said precipitated silica, (when said tread groove rubber layer composition contains said precipitated silica), having a moiety reactive with hydroxyl groups (e.g. silanol groups) on said precipitated silica and another different moiety interactive with said elastomer(s), and (4) dispersion within and on the surface of said tread groove rubber layer of a plasticizer comprised of polyester phthalate in an amount of from about 5 to about 40, alternately from about 5 to about 20 phr thereof, (exclusive of dibutoxy ethyl adipate), wherein said tread rubber composition is exclusive of said polyester phthalate.

Representative of such polyester phthalate is Plasthall® P900 from Ester Solutions.

A philosophy for use of the polyester phthalate dispersion in the rubber layer on the groove surface is to create hydrophilicity for the exposed groove surface is to promote formation of a thin water layer film on and external to the tread groove surface to facilitate by reducing the wet coefficient of friction at an interface between the tread groove surface and water-containing mud or snow contained in said tread groove.

Representative examples of such conjugated diene-based elastomers are, for example, cis 1,4-polyisoprene (natural or synthetic cis 1,4-polyisoprene rubber), cis 1,4-polybutadiene, styrene/butadiene copolymers (emulsion and solution polymerization prepared), styrene/isoprene/butadiene terpolymers as well as styrene/isoprene/styrene and styrene/butadiene/styrene block copolymers.

In one aspect, it may be desirable for said tread outer layer and said tread groove rubber layer to be an elastomer composition comprised of one or more of said conjugated diene-based elastomers. In such case, it may be desirable to exclude any appreciable amount, preferably to be exclusive of, low unsaturation elastomers such as, for example, isobutylene copolymers, particularly butyl rubber in a case where it may desired for the elastomer of the rubber layer to be composed entirely of a conjugated diene-based rubber.

In one embodiment, such tread groove rubber layer for said tread grooves is co-extruded with and co-vulcanized with the tire tread and is thereby integral with the rubber tread.

As indicated, the aforesaid rubber layer for the tread grooves is desirably a relatively thin layer such as, for example, having a thickness in a range of from about 0.05 to about 2.5, alternately, and usually more desirably, from about 0.12 to about 0.5 millimeters (mm), depending somewhat upon the size of the tire, nature of the tread grooves and intended use for the tire.

In one aspect, the aforesaid thin tread groove rubber layer on the surface the tread grooves is desirably exclusive of the running surface of the tread in a sense of at least substantially exclusive of the running surface of the tread lugs and is thereby intended to have a minimal, if any, contact with the road to therefore have minimal, if any, effect upon the wear and traction characteristics of the running surface of lugs of the tire tread.

In one embodiment, a method of preparing said tire comprises co-extruding said tread rubber composition and layer of said thin tread groove rubber composition on its outer surface to form a composite thereof in a form of an uncured rubber strip composite, building an uncured rubber tire having said uncured tire tread rubber strip composite positioned circumferentially around the outer portion of an uncured tire rubber carcass to form a tire assembly thereof, and subsequently co-vulcanizing the said tire assembly in a suitable mold at an elevated temperature and pressure to form a cured rubber tire having a cured rubber tread with a configuration comprised of lugs and intervening grooves between said lugs, wherein said thin tread groove rubber layer is contained on a combination of the outer surface of said tread outer surfaces of said tread grooves.

In one embodiment, such method further comprises removing said cured rubber layer from the running surfaces of said tread lugs by abrading it away, or allowing it to be abraded away (for example, by grinding the rubber layer away from the tire tread's running surface or allowing it to wear way during use of the tire).

In one embodiment, filler reinforcement for said thin tire groove rubber layer composition is rubber reinforcing carbon black. In one embodiment said rubber reinforcing carbon black has an iodine value (ASTM Test D1510) in a range of from about 10 to about 60 g/kg in combination with a DBP (dibutyl phthalate) value (ASTM Test D2414) in a range of from about 50 to about 140 cc/100 g, (such as, for example, a rubber reinforcing carbon black having an ASTM designation of N550, N660 or N754) to promote a faster wearing rubber composition.

For a further understanding of the invention, drawings are presented to depict a tire with tread of a cap/base construction which is composed of lugs and grooves.

THE DRAWINGS

Figure 1:
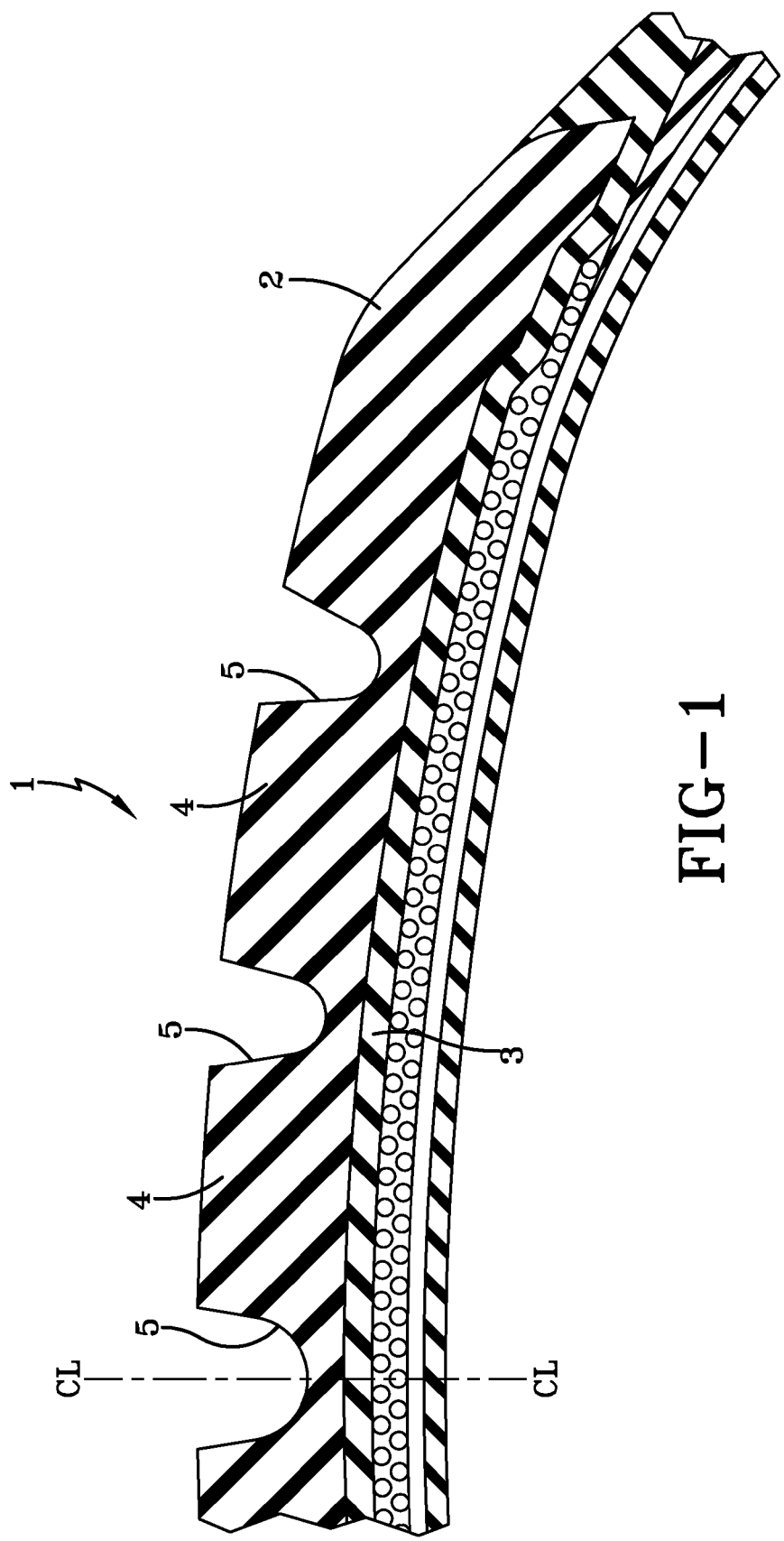
FIG. 1 is a partial cross-section of a cured rubber tire tread of a cap/base construction illustrated to show its lug and groove configuration.

In FIG. 1, a partial tire cross-section (1) is shown having a tread of a cap/base configuration with an outer tread rubber cap layer (2) composed of lugs (4) and grooves (5), where the grooves (5) may contain water which contains mud or snow, and tread rubber base layer (3) underlying said tread cap rubber layer (2).

Figure 2:
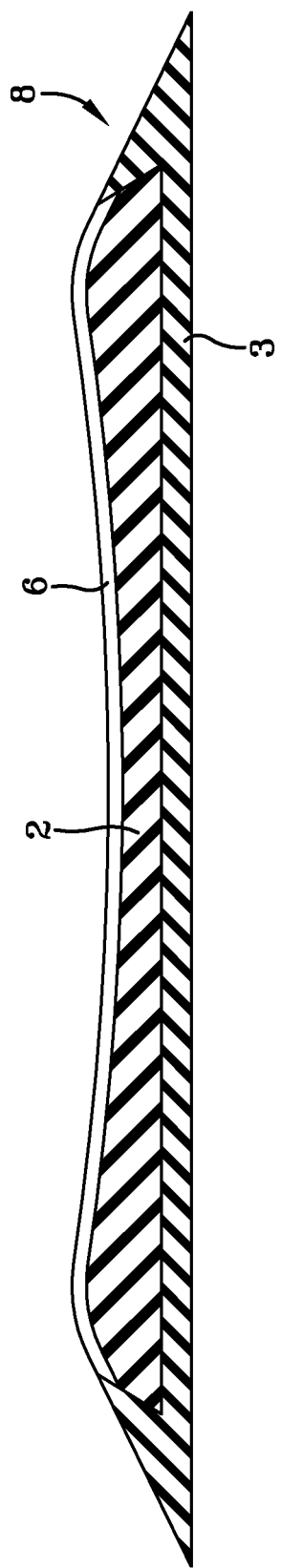
FIG. 2 is a cross-section of an uncured rubber tread strip prior to molding and curing to from the lug and groove configuration.

In FIG. 2, a cross-section of an uncured, shaped, rubber tread strip (8) composite is shown which is comprised of co-extruded rubber layers which will become a tread cap layer (2) exclusive of polyester terephalate and thin rubber layer (6) containing a dispersion of polyester phthalate to promote its hydrophilic property, where said rubber layers are rubber compositions individually comprised of diene-based elastomer compositions which contain a dispersion of polyester phthalate.

Figure 3:
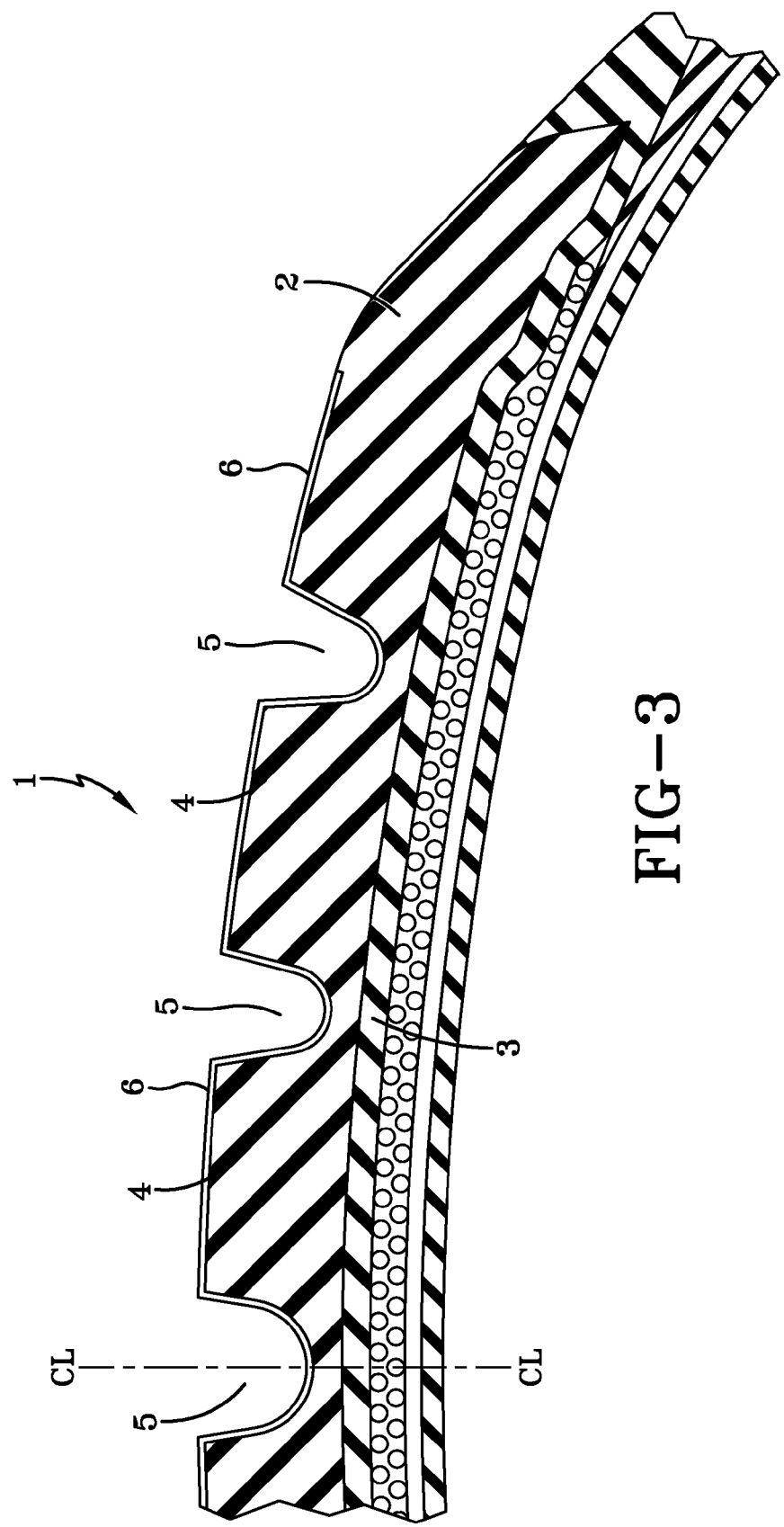
FIG. 3 is a partial cross-section of a molded and cured rubber tire tread of a cap/base construction configured with lugs and grooves wherein the running surface the tread's lugs and surfaces of its intervening grooves is comprised of a thin tread groove rubber layer.

FIG. 3 depicts a molded tire cross-section (1) which is similar to FIG. 1 in which the water repellent (hydrophilic) elastomer layer (6) extends from the tread grooves (5) over the running surface of the tire tread.

Figure 4:
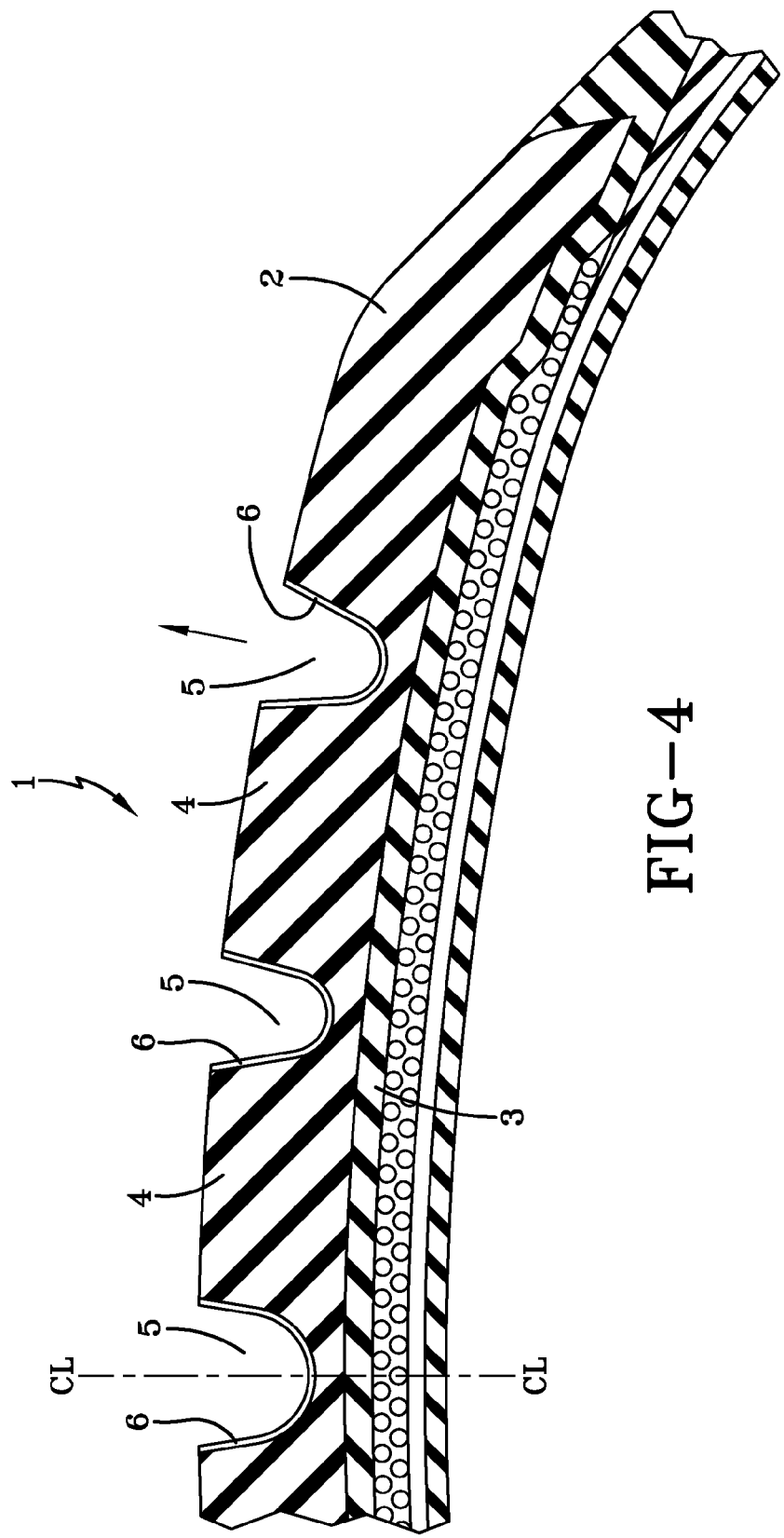
FIG. 4 is a partial cross-section of a cured rubber tire tread of a cap/base construction configured with lugs and grooves wherein the surface of the tread grooves contains a thin tread groove rubber layer essentially exclusive of the outer running surface of the tread grooves, namely a minimal, if any, contact with the road over which the tire travels.

FIG. 4 is similar to FIG. 2 except that its tread grooves (5), inclusive of the walls and bottom portions of the grooves, contain a tread groove rubber layer (6) on the surface of the grooves surfaces composed of a co-extruded, co-vulcanized thin rubber composition which contains a dispersion in a range of from about 12 to about 30 phr of polyester terephalate to promote a hydrophilic property for the tire groove rubber layer (6) which, as can be seen in the Drawing, is exclusive of, in a sense of being substantially exclusive of, the running surface of the tread. In one embodiment, it is envisioned that water repelled from the running surface of the tread lugs into the tread grooves is resisted from being repelled from the tread groove back to the running surface of the tread except by rotational centrifugal source of the tire on an associated vehicle.

The tread rubber components of the tread, including the tread running surfaces and groove faces are individually comprised of diene-based elastomers.

It is readily understood by those having skill in the art that the elastomeric composition for the elastomeric layer on the surface of the tread grooves may be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, antioxidants and antiozonants, peptizing agents and reinforcing materials such as, for example, carbon black (for the black colored rubber composition). As known to those skilled in the art, depending on the intended use of the sulfur vulcanizable and sulfur vulcanized material (rubbers), the additives mentioned above are selected and commonly used in conventional amounts.

Representative of phenolic antidegradants for use in this invention are, for example, antioxidants such as polymeric hindered phenol, Wingstay® HLS available from The Goodyear Tire & Rubber Company, including phenolic antidegradants disclosed in *The Vanderbilt Rubber Handbook* (1978), Pages 344 through 346. Other non-staining antidegradants such as poly(oxyalkylene) amine known as OZONOX RP-2 available from Sovereign Chemical Company and cyclic acetal known as Vulkazone AFS available from Bayer A.G., can be considered part of this invention.

Representative non-aromatic rubber processing oils for use in this invention, namely such oils which contain less than 15 weight percent aromatic compounds, if at all, are, and for example, contain 46 percent to 51 percent content and 36 percent to 42 percent naphthenic content.

Typical amounts of fatty acids, if used which can include stearic, palmitic and oleic acids, comprise about 0.5 to about 5 phr. Typical amounts of zinc oxide can comprise, for example, about 1 to about 5 phr. Typical amounts of waxes can comprise, for example, about 1 to about 5 phr. Often microcrystalline waxes are used. Typical amounts of peptizers can comprise, for example, about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging, for example, from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging, for example, from about 0.5 to about 4, usually, for example, from about 0.8 to about 2.0, phr. In another embodiment, combinations of a primary and a secondary accelerator might be used with the secondary accelerator usually being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least two stages, namely, at least one non-productive (preparatory) stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The invention may be better understood by reference to the following example in which the parts and percentages are by weight unless otherwise indicated.

EXAMPLE I

Rubber Samples A through D were prepared for evaluation.

Rubber Sample A was a Control rubber composition and rubber Samples B through D were Experimental rubber compositions.

Experimental rubber Samples B through D contained a large dispersion (15 and 30 phr, respectively) of polyester phthalate within and on the surface of the rubber compositions to promote hydrophobicity for the rubber compositions beyond promoting a more simple plasticizing effect by the polyester phthalate.

The general rubber compositions are exemplified in the following Table 1 with parts and percentages being by weight unless otherwise indicated.

TABLE 1

| | Control | Experimental Samples | | |
|---|---|---|---|---|
| | A | B | C | D |
| First Non-Productive Mixing Step, (NP1) (to about 160° C.) | | | | |
| Natural rubber (SMR20) | 100 | 100 | 100 | 100 |
| Carbon black (N121)[1] | 32 | 32 | 32 | 32 |
| Polyester phthalate[2] | 0 | 15 | 30 | 15 |
| Silica, precipitated[3] | 28 | 28 | 28 | 28 |
| Silica coupling agent[4] | 2.8 | 2.8 | 2.8 | 2.8 |
| Rubber processing wax | 1.5 | 1.5 | 1.5 | 1.5 |
| Peptizing Agents | 0.2 | 0.2 | 0.2 | 0.2 |
| Antioxidant[5] | 3 | 3 | 3 | 3 |
| Zinc oxide | 3 | 3 | 3 | 3 |
| Fatty acid[6] | 3 | 3 | 3 | 3 |
| Second Non-Productive Mixing Step, (NP2), (to about 160° C.) | | | | |
| No ingredients added | | | | |
| Productive Mixing Step, (P), (to about 115° C.) | | | | |
| Accelerators[7] | 1.5 | 1.5 | 1.5 | 1.75 |
| Sulfur | 1.2 | 1.2 | 1.2 | 1.5 |

[1]Rubber reinforcing carbon black as N121, an ASTM designation
[2]Polyester phthalate as PLASTHALL P-900 from the Ester Solutions Company
[3]Precipitated silica as Zeosil™ Z1165 MP from the Rhodia Company
[4]Coupling agent for said precipitated silica comprised of a bis(3-triethoxysilylpropyl) polysulfide having an average of from about 2 to about 2.6 connecting sulfur atoms as Si266™ from Evonik Degussa
[5]Antioxidant as mixed aryl-p-phenylenediamines and N-(1,3-dimethyl butyl)-N'-phenyl-p-phenylene diamine
[6]Primarily stearic, palmitic and oleic acids
[7]Sulfenamide and diphenyl guanidine sulfur cure accelerators The rubber compositions of Table 1 where evaluated for various physical properties and various physical properties ware reported in Table 2. Where appropriate, rubber compositions were cured for about 14 minutes at about 160° C.

TABLE 2

| | Control | Experimental Samples | | |
|---|---|---|---|---|
| | A | B | C | D |
| Natural rubber | 100 | 100 | 100 | 100 |
| Polyester phthalate | 0 | 15 | 30 | 15 |
| Accelerators[12] | 1.5 | 1.5 | 1.5 | 1.75 |
| Sulfur | 1.2 | 1.2 | 1.2 | 1.5 |
| Rheometer, 160° C. | | | | |
| Maximum torque (dNm) | 16.8 | 12.2 | 9.1 | 14.4 |
| Minimum torque (dNm) | 3.0 | 2.1 | 1.6 | 2.2 |
| Delta torque (dNm) | 13.8 | 11.1 | 7.5 | 12 |
| T90, minutes | 6.1 | 6.5 | 15.2 | 5.9 |
| RPA test (Rubber Process Analyzer) | | | | |
| Uncured dynamic storage modulus G' (KPa) at 15% strain, 0.83 Hertz, 100° C. | 229 | 170 | 116 | 175 |
| Dynamic storage modulus G' (MPa) at 10% strain, 11Hertz, 100° C. | 1.56 | 1.33 | 1.00 | 1.42 |
| Tan delta at 10% strain, 11 Hertz, 100° C. | 0.16 | 0.19 | 0.26 | 0.18 |
| Stress-strain | | | | |
| Tensile strength (MPa) | 23.0 | 21.0 | 17.5 | 22.0 |
| Elongation at break (%) | 556 | 590 | 601 | 576 |
| 100% modulus, ring (MPa) | 2.1 | 1.9 | 1.6 | 2.2 |
| 300% modulus, ring (MPa) | 11.2 | 9.3 | 7.5 | 10.5 |
| Rebound | | | | |
| 23° C. | 48 | 44 | 41 | 46 |
| 100° C. | 63 | 61 | 58 | 64 |
| Hardness, Shore A | | | | |
| 23° C. | 64 | 63 | 63 | 66 |
| 100° C. | 55 | 53 | 52 | 57 |
| Coefficient of Friction (COF)[1] | | | | |
| Static peak COF (dry substrate) | 3.2 | 2.4 | 2.2 | 2.6 |
| Kinetic peak COF (dry substrate) | 3.6 | 2.8 | 2.5 | 2.9 |
| Static Peak COF[2] (wet substrate) | 1.3 | 0.29 | 0.39 | 0.28 |
| Kinetic Peak COF[3] (wet substrate) (lower values are better for this invention) | 0.81 | 0.29 | 0.30 | 0.24 |

[1]ASTM D-1894. A coefficient of friction (COF) value for a rubber sample may be measured, for example, on a Model SP-2000 Slip/Peel tester from IMASS Inc at 6 inches (about 15.2 cm) per minute using a 200 g sled against a substrate surface such as, for example, a polished aluminum surface. Static Peak COF occurs when a maximum friction occurs before the block begins to move on the substrate surface. Kinetic Peak COF occurs as the block is moving on the substrate surface.

From Table 2 it is observed that rubber Samples B, C and D with their large polyester phthalate contents exhibited significantly and beneficially decreased Static and Kinetic wet coefficients of friction as compared to Control rubber Sample A without the polyester phthalate.

This is considered as being significant in the sense that this is indicative of significantly and beneficially increased hydrophilicity for the substrate surface which include the large contents of the polyester phthalane dispersion on the surface of the rubber composition.

It is concluded that the presence of the dispersion, particularly with a large concentration, or content, of the polyester phthalate, on the surface within and on the surface of the rubber composition, enables a promotion of a hydrophilic property which, in turn, promotes formation of a thin film of water on the surface of the rubber composition, particularly as a thin rubber layer on a tire tread groove surfaces to enable resistance of water borne, or water-containing, mud or snow from adhering to the rubber surface, particularly to the tire tread groove surface.

While various embodiments are disclosed herein for practicing the invention, it will be apparent to those skilled in this art that various changes and modifications may be made therein without departing from the spirit or scope of the invention.

What is claimed is:

1. A tire having a rubber tread configured with lugs and grooves positioned between said lugs wherein said tread contains, based on parts by weight per 100 parts by weight rubber (phr) a thin tread groove rubber layer on the outer surface of said tread grooves of said tread and exclusive of any appreciable amount of the running surface of said tread, where said tread groove rubber layer has a thickness in a range of from about 0.05 to about 2.5 millimeters (mm), wherein said tread groove rubber layer composition comprises:

(A) at least one conjugated diene-based elastomer consisting of at least one polymer of at least one of cis 1,4-polyisoprene, cis 1,4-polybutadiene and styrene/butadiene copolymers, where said elastomer(s) are exclusive of:

(1) quaternary polymers comprised of a combination of all of an unsaturated olefinic nitrile, vinyl aromatic compound, conjugated diene and polar polymerizable compound, and (2) vinyl pyridine based polymers;

(B) dispersion of reinforcing filler in said rubber composition comprised of:

(1) rubber reinforcing carbon black, or (2) amorphous, synthetic precipitated silica, or (3) combination of precipitated silica and rubber reinforcing carbon black, and (C) silica coupling agent for said precipitated silica, having a moiety reactive with hydroxyl groups on said precipitated silica and another different moiety interactive with said elastomer(s), and (D) dispersion within and on the surface of said tread groove rubber layer of a plasticizer comprised of polyester phthalate in an amount of from about 5 to about 40 phr thereof, exclusive of dibutoxy ethyl adipate, wherein the rubber composition of said tread is exclusive of said polyester phthalate.

2. The tire of claim 1 where, for said tread groove rubber layer, said reinforcing filler is a dispersion of a combination of precipitated silica and rubber reinforcing carbon black.

3. The tire of claim 1 where, for said tread groove rubber layer, said reinforcing filler is a dispersion of rubber reinforcing carbon black.

* * * * *